United States Patent Office 2,985,664
Patented May 23, 1961

2,985,664

HEXURONIC ACID DERIVATIVES

Ernst T. Krebs and Ernst T. Krebs, Jr., both of 64 Capp St., San Francisco, Calif.

No Drawing. Filed May 29, 1957, Ser. No. 662,338

5 Claims. (Cl. 260—345.7)

This invention relates to certain sugar derivatives having preservative properties. More particularly this invention relates to certain cyanophoric derivatives of hexuronic acids which have a preservative effect on meat and other organic products which are normally subject to putrefactive change.

This application is a continuation-in-part of our co-pending application Serial No. 365,249, filed June 30, 1953, now abandoned, entitled "Glucose Derivatives."

We have found that mandelo nitrile derivatives of hexuronic acids have valuable preservative properties. They are capable of preserving meat for animal and human consumption, other food products such as fish and the flesh of fowls and biological specimens and other organic matter which is subject to putrefactive change.

The compounds of the invention may be broadly characterized by the following Formula I. Formula I is not intended to be a steric formula. The steric formulae of preferred compounds are disclosed hereinafter.

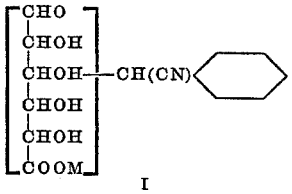

I

In Formula I the hexuronic portion of the molecule, which is enclosed in brackets, represents a hexose sugar in which the terminal primary alcohol group has been oxidized to a carboxyl group. The mandelo nitrile radical

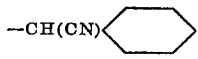

is connected to the hexuronic acid by an ether linkage, and its benzene ring may be substituted by such groups as methyl, ethyl, n- or iso-propyl, nitro, etc. In Formula I M may be hydrogen, a salt-forming ion such as ammonium, sodium, potassium, calcium or barium or a low molecular weight ester-forming radical such as methyl, ethyl n- or isopropyl or n-iso or tert. butyl.

The preferred compounds of the invention are pyranosides having six-membered rings, and the mandelo nitrile radical is connected by an ether linkage to the number six carbon atom, counting from the carboxy group. Therefore, the preferred compounds of the invention are typified by the following structural Formula II

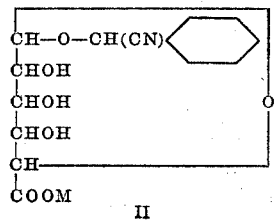

II

The above formula is not intended to be a steric formula showing the relative positions of the hydrogen atoms and hydroxyl radicals. However, it will serve to illustrate the fact that the preferred compounds are: (1) hexuronic acid derivatives, (2) in the form of a six-membered pyranose ring with (3) the mandelo nitrile radical attached to the terminal carbon atom in relation to the carboxy group.

Most advantageously we employ mandelo nitrile-$\beta$-D-glucoronic acid salts and mandelo nitrile-$\alpha$-D-galacturonic acid salts which have the following steric Formulae III and IV, respectively.

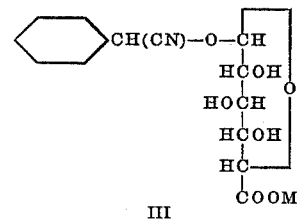

III

Salts of mandelo nitrile-$\beta$-D-glucuronic acid

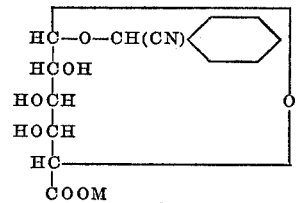

IV

Salts of mandelo nitrile-$\alpha$-D-galacturonic acid

In the above Formulae or Compounds III and IV, M is preferably sodium or potassium and the mandelo nitrile group radical may be the dextro (d), laevo (l) or racemic (dl) form.

Several methods of preparation are available. Compound III (the glucuronate) may be prepared by starting with amygdalin, hydrolyzing to $\beta$ glucose and mandelo nitrile glucoside and oxidizing the latter to the glucuronate. The method described in Fieser & Fieser "Organic Chemistry," 3rd ed., page 380 (using a yeast extract), may be employed to hydrolyze amygdalin to produce the desired mandelo nitrile $\beta$ glucoside. Preferably a procedure is employed as follows: 10 grams of finely powdered amygdalin are placed in 90 cc. of yeast solution prepared by steeping one part of brewer's yeast in 20 parts of water at 35° C. for 20 hours, then filtering. Preferably 0.2 gram of toluene is added to sterilize the yeast solution to repress secondary reactions. The mixture of amygdalin and yeast solution is incubated at 35° for 7 days with agitation. The mixture, having a faint odor of benzaldehyde, is filtered and any nonwater-miscible liquid (benzaldehyde and mandelo nitrile) is separated. The aqueous filtrate is concentrated under reduced pressure to a syrupy product boiling at 35–40° C. at 30 mm. mercury pressure. Three volumes of hot absolute ethyl alcohol are added and the solution is filtered hot, thereby removing proteins, sugars and other insoluble products. White crystals of l-mandelo nitrile-$\beta$-D-glucoside separate on cooling and are recovered by suction filtering and recrystallizing twice in fresh absolute ethyl alcohol.

These crystals are white in color, melt at 149–155° C., are soluble in water, acetone and ethyl alcohol and give a positive cyanide test with guaiac-copper sulfate paper.

Oxidation of the glucoside to the glucuronate may be carried out as follows: 1.5 grams of platinum black are added to a solution of 3 grams of l-mandelo nitrile-$\beta$-D- glucoside in 300 cc. of water which is maintained at 65° C. and is stirred continuously. Molecular oxygen is bubbled through the solution for seven hours. The platinum black is filtered off and the filtrate is neutralized with dilute aqueous NaOH solution. The solution is then shell frozen and lyophilized to produce sodium l-mandelo nitrile-β-D-glucuronate, which consists of shiny white crystals which are soluble in water, have a melting point of 112 to 116° C. and give a positive test for cyanide with guaiac-copper sulfate paper. pH of the glucuronate before addition of NaOH is 3.5, and is adjusted to 7 with NaOH. The glucuronate has a melting point of 214–216° C.

The guaiac-copper sulfate tests referred to above may be carried out as follows: Saturate strips of filter paper in a freshly prepared, unfiltered 10% aqueous gum guaiac solution. This paper is dried, then moistened with 0.1% aqueous copper sulfate solution. A standard solution of 100 mgs. of glucoside or glucuronate in 5 cc. of water is prepared. Aliquots are placed in erlenmeyer flasks and to one flask is added a standard solution of Taka-diastase or beta glucuronidase. An equal volume of water is added to the other flask. The flasks are stoppered immediately with stoppers having attached thereto moistened strips of guaiac-copper sulfate paper. After 30 minutes, both flasks are gently warmed on a water bath. Within twenty-four hours the paper will turn blue in the flask to which the enzyme has been added.

The above synthesis of l-mandelo nitrile-β-D-glucuronate employs amygdalin as the source material. In accordance with our invention, amygdalin is preferably prepared from a natural source material such as kernels of the apricot, almonds and other members of the Prunus family and from kernels of other plants containing cyanogenetic gluosides. This is preferably done by the following method:

A suitable source material, such as apricot kernals, is finely ground, then percolated with acetone followed by ether until the wash liquid is clear. Fats and oils are removed in this manner. The defatted meal is then air dried and added to a boiling solvent such as high proof ethyl alcohol or "Shellacol) SDA No. 1, which is a trademark of Commercial Solvents, Corp., for a solution of 2% denatured methyl alcohol, 1% ethyl acetate and 1% aviation gasoline in ethyl alcohol. For example, 250 fluid ounces of the above Shellacol solvent or 195 proof ethyl alcohol are boiled on a water bath and to the boiling solvent are added 3 pounds of the meal. The mixture is stirred, then covered and allowed to boil 5 minutes. The mass is then filtered and the residue on the filter discarded. When the filtrate has cooled down, ⅓ volume of ethyl ether is added and the mass is chilled in a deep freeze. Amygdalin precipitates out and is filtered and washed with ethyl ether, then air dried and redissolved in warm water. If oil droplets appear on the surface of the aqueous solution, they are separated, as in a separatory funnel. The aqueous solution is then filtered through a Seitz filter and is shell frozen and lyophilized.

The above method of preparing l-mandelo nitrile-β-D-glucuronate from amygdalin involves an available natural material which can be derived from such sources as almonds. The method is one of degradation and oxidation. Synthetic methods are also available, as follows:

Example 1 l-Mandelo nitrile is condensed with beta glucose to produce l-mandelo nitrile-beta glucoside, which is then oxidized as described above to the corresponding glucuronate. Alternatively, the racemic form of mandelo nitrile may be employed and the dextro form selectively destroyed or removed, as by the use of a specific enzyme.

Example 2 l-Mandelo nitrile is condensed with beta glucuronic acid to produce the desired glucuronate directly. As in Example 1, the racemic form of mandelo nitrile may be used and the dextro form selectively removed from or destroyed in the glucuronoside.

Compound IV (mandelo nitrile-α-D-galacturonate) may be prepared by a series of reactions as follows:

(1) METHYLATION OF -α-D-GALACTURONIC ACID

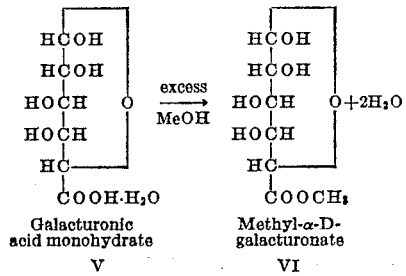

Galacturonic acid monohydrate
V

Methyl-α-D-galacturonate
VI 42 grams (0.2 mol) of α-D-galacturonic acid monohydrate were suspended in 500 cc. (12.3 mols) of absolute methanol and the mixture was refluxed 72 hours on a hot water bath. The solution was then decolorized with Norit A and the solvent was removed in vacuo. The residue was dissolved in 225 cc. of absolute ethanol and allowed to stand at 0° C. for 48 hours. 4 grams of unchanged galacturonic acid were removed by filtration and the alcoholic filtrate was concentrated in vacuo. The faintly yellow, syrupy residue of methyl-α-D-galacturonate was dried to constant weight. 35 grams (an 84% yield) were obtained.

(2) ACETYLATION OF METHYL GALACTURONATE

The purpose of this step is to protect the hydroxyl groups which may be done by acetylating them. This was done by slowly adding a mixture of 150 cc. (1.6 mols) of acetic anhydride and 100 cc. of pyridine precooled below 0° C. to 35 grams (0.17 mol) of methyl galacturonate with constant swirling. After standing overnight in a refrigerator the reaction mixture was poured onto 50 grams of crushed ice and extracted 3 times with 125 cc. portions of chloroform. The combined chloroform layers were washed with dilute sulfuric acid, then with water, then with sodium bicarbonate solution and again with water and dried with anhydrous sodium sulfate. The chloroform solution was concentrated in vacuo on a water bath with the temperature below 40° C. to produce a syrup. The syrup was dried in a vacuum desiccator over phosphorus pentoxide until a constant weight was obtained. The yield was 52 grams (81.3% of theory). The product is represented by the following Formula VII

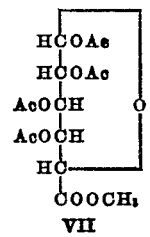

VII

Methyl tetra-O-acetyl-α-D-galacturonate (3) BROMINATION OF COMPOUND VII

Compound VII was brominated as follows: 27 grams (0.07 mol) of Compound VII were dissolved in 100 cc. of 30% hydrobromic acid solution in acetic acid. The mixture, after solution, was allowed to stand in a refrigerator overnight. The solvent was removed under vacuum at 10 to 12 millimeters pressure over a bath having a temperature of 40° C. and the residue was dissolved in 50 cc. of chloroform. The chloroform solution was extracted with cold, saturated aqueous sodium bicarbonate and then with water. After drying the chloroform solution with anhydrous sodium sulfate the solvent was removed in vacuo. The residual syrup was dissolved in 75 cc. of absolute ethanol and was decolorized with Norit A, suction filtered and the filtrate was refrigerated overnight. The yield was 22.5 grams (81% of theory). The crystals melted at 110°–113° C. (uncorrected). They must be kept bottled under refrigeration to prevent decomposition. If decomposition is noted, the material may be dissolved in ethanol, decolorized in the presence of calcium carbonate, filtered and recrystallized to yield a product of the original purity and stability.

The resulting compound has the following structure

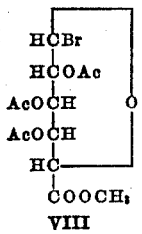

VIII

Methyl-tri-O-acetyl-bromo-α-D-galacturonate

(4) SYNTHESIS OF dl-MANDELO NITRILE

This material may be prepared by a known method which involves reacting benzaldehyde with sodium bisulfite and then with potassium cyanide in accordance with the following equations.

$$C_6H_5CHO + NaHSO_3 \rightarrow C_6H_5CH(OH)SO_3Na$$

$$C_6H_5CH(OH)SO_3Na + KCN \rightarrow C_6H_5CH(OH)CN + KNaSO_3$$

The resulting dl-mandelo nitrile should be freshly prepared for use in chemical reactions because, on standing, rearrangement takes place.

(5) PREPARATION OF dl-MANDELO NITRILE DERIVATIVE OF COMPOUND VIII

Compound VIII is reacted with dl-mandelo nitrile to yield Compound IX in accordance with the following equation

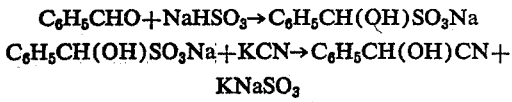

VIII

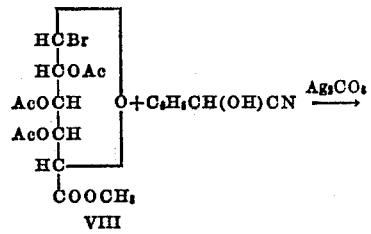

IX

Methyl dl-mandelo nitrile-tri-O-acetyl-α-D-galacturonate 45 grams (0.11 mol) of Compound VIII were dissolved in 200 cc. of absolute chloroform (distilled and dried over $P_2O_5$ and redistilled and dried over Drierite) and a 250 cc. separatory funnel. 66.5 grams (0.5 mol) of dl-mandelo nitrile were dissolved in 300 milliliters of absolute chloroform in a 1 liter two-necked, roundbottom flask to which 10 grams of Drierite and 27.6 grams (0.1 mol) of silver carbonate were added. A mechanical stirrer was attached to one neck and a separatory funnel containing the compound No. VIII was attached to the other neck. The flask was covered with a black cloth to exclude light. Compound VIII was added in about 1 hour while stirring and the mixture was stirred overnight at room temperature. The silver salts were collected on a filter and washed with hot chloroform. The filtrates were combined and evaporated in vacuo to a gummy mass. The residue was dissolved in boiling isopropyl alcohol and allowed to crystallize. The crystals were recrystallized from boiling isopropyl alcohol. 21 grams of Compound IX were obtained. It is a crystalline material, white in color, having a melting point (uncorrected) of 162 to 165° C.

(6) PREPARATION OF POTASSIUM dl-MANDELO NITRILE-α-D-GALACTURONATE

The three acetyl groups of Compound IX are removed by hydrolytic action of barium methoxide and water thereby yielding the barium salt. The barium is replaced by hydrogen by treatment with sulfuric acid. The desired end product, the potassium salt, is formed by reaction with potassium hydroxide.

More specifically, 21 grams (0.047 mol) of Compound IX were dissolved in 1 liter of methanol containing 21 cc. of 0.5 normal barium methoxide. The solution was refrigerated for three days. Barium was then removed by the addition of the calculated amount of dilute sulfuric acid. The mixture was filtered and the filtrate was concentrated in vacuo. The residue was suspended in boiling benzene and enough ethanol added to obtain a homogeneous solution. The acid obtained on cooling yielded 12 grams of product which melted at 164–167° C. (uncorrected). It was dissolved in 50 cc. of ethanol and neutralized by 2.24 grams (0.04 mol) of potassium hydroxide dissolved in 100 cc. of ethanol. Crystals of the potassium salt were precipitated yielding 13.8 grams of Compound X having the following formula

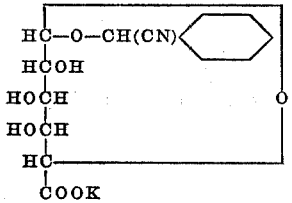

X

Potassium-dl-mandelo nitrile-α-D-galacturonate

Compound X is a white crystalline material, melts with decomposition at 176° C., is soluble in water, slightly soluble in alcohol, insoluble in ether and chloroform.

*Example 3.—Tests of Compound III as preservative*

3 gram and 30 gram specimens of raw beef muscle (scraps of steak), and of raw horse liver intended as pet food were taken. A 1% aqueous solution of the said sodium salt of l-mandelo nitrile-β-D-glucuronic acid (Compound III, M=sodium) was prepared. Gauze of five or six ply thickness was saturated with this solution. Specimens of the beef muscle and horse liver were wrapped in the saturated gauze and were kept for periods of time in excess of one week at room temperature (about 40° to 88° F.). Control specimens of the same beef muscle and horse liver were kept under identical conditions except that the gauze wrapping contained only sterile water and no added preservative agent.

At the end of this time the specimens wrapped in gauze which had been saturated with the solution of Compound III (sodium salt) were in what appeared to be a perfectly preserved state with no odor and with the same appearance and feel as the original specimens. On the other hand, the control specimens were putrid and had the color and soft, slimy, mucoid feel of putrefied meat.

It was abundantly apparent that putrefaction had occurred in the one case (the controls) and had not occurred in the other case (the specimens wrapped in gauze saturated with sodium l-mandelo nitrile-β-D-glucuronate).

Similar tests were carried out with raw chicken meat. That is, test specimens were wrapped in gauze saturated with a 1% aqueous solution of Compound III (sodium salt) and control specimens were wrapped in gauze saturated with sterile water. Test and control specimens were left in their gauze wrappings at room temperature. The test specimens underwent no putrefaction whereas the control specimens putrefied.

To demonstrate lack of toxicity, specimens of beef above described after preservation Compound III (sodium salt) were fed to a house cat, which relished the food and suffered no ill effects.

*Example 4.—Tests of Compound X as preservative*

A 1% solution of Compound X was prepared and gauze was soaked in the solution. Meat was wrapped in gauze and placed in a beaker at normal room temperature (about 75° F. in the daytime, 55–60° F. during the night). A control was treated identically, that is, a portion of the same lot of meat was wrapped in a gauze soaked in sterile water and kept in a beaker under the same conditions.

The control sample began to smell offensive on the second day. By the end of the fifth day it was very foul and putrefaction had advanced to a considerable degree. On the other hand, at the end of the fifth day the test sample wrapped in gauze soaked in solution of Compound X exhibited no visible or olfactory evidence of putrefaction and its feel was devoid of the slimy mucoid feel of spoiled meat.

If meat or other food preserved in this manner is intended for animal or human consumption, it is preferable to wash off the surface of the meat because, although the preservative material is nontoxic to humans and animals, it may impart an off flavor. Such off flavor can be readily removed by washing.

Besides the above described mandelo nitrile-α-D-galacturonates and mandelo nitrile-β-D-glucuronates, other similar hexuronic acid derivatives may be employed; e.g., stereoisomers of the above in which, instead of a galacturonic or glucuronic acid group another hexuronic acid group is employed; e.g., the acids of mannose, allose, altrose, talose, gulose and idose prepared by oxidizing the terminal primary alcohol group to a carboxy group.

It will, therefore, be apparent that novel and very effective preservative agents have been provided.

The terms "Norit A" and "Drierite" used hereinabove are trademarks of commercially available drying agents. "Norit A" is the trademark of Coleman & Bell Co. of Norwood, Ohio, for a charcoal drying agent and "Drierite" is the trademark of W. A. Hammond Drierite Co. of Xenia, Ohio, for a calcium sulfate drying agent.

We claim:

1. Compounds of the type

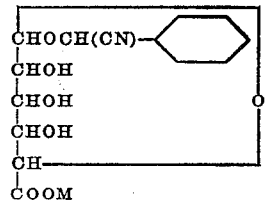

in which M is selected from the group consisting of hydrogen, ammonium, alkali metals and alkaline earth metals.

2. Alkali metal salts of mandelo nitrile-β-D-glucuronic acid.

3. The sodium salt of l-mandelo nitrile-β-D-glucuronic acid.

4. Alkali metal salts of mandelo nitrile-α-D-galacturonic acid.

5. The potassium salt of dl-mandelo nitrile-α-D-galacturonic acid.

References Cited in the file of this patent

UNITED STATES PATENTS 2,562,200     Mehltretter _____ July 31, 1951

OTHER REFERENCES

Merck Index, pp. 598; 800, 6th ed. (1952).